United States Patent
Lindsay (10) Patent No.: US 9,916,329 B2
(45) Date of Patent: Mar. 13, 2018

(54) SELECTING IMAGES ASSOCIATED WITH CONTENT RECEIVED FROM A SOCIAL NETWORKING SYSTEM USER

(71) Applicant: Facebook, Inc., Menlo Park, CA (US)

(72) Inventor: Robert Taaffe Lindsay, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 164 days.

(21) Appl. No.: 13/933,571

(22) Filed: Jul. 2, 2013

(65) Prior Publication Data

US 2015/0012525 A1 Jan. 8, 2015

(51) Int. Cl.
*G06F 17/30* (2006.01)

(52) U.S. Cl.
CPC .... *G06F 17/30268* (2013.01); *G06F 17/3053* (2013.01)

(58) Field of Classification Search
CPC .......... G06F 17/30091; G06F 17/3064; G06F 17/30793
USPC ........................................................ 707/722
See application file for complete search history.

(56) References Cited

U.S. PATENT DOCUMENTS

| | | | | |
|---|---|---|---|---|
| 6,324,541 | B1 * | 11/2001 | de l'Etraz | G06F 17/30014 |
| 7,249,123 | B2 * | 7/2007 | Elder | G06Q 10/10 |
| 7,797,732 | B2 * | 9/2010 | Tam | G06F 21/10 |
| | | | | 709/205 |
| 8,438,122 | B1 * | 5/2013 | Mann | G06N 99/005 |
| | | | | 706/12 |
| 8,867,849 | B1 * | 10/2014 | Kirkham | G06F 17/30268 |
| | | | | 382/224 |
| 8,990,201 | B1 * | 3/2015 | Johnston | G06F 17/3064 |
| | | | | 707/722 |
| 2005/0060417 | A1 * | 3/2005 | Rose | G06Q 10/00 |
| | | | | 709/228 |
| 2005/0193010 | A1 * | 9/2005 | DeShan | G06Q 30/02 |
| 2005/0216300 | A1 * | 9/2005 | Appelman | G06Q 10/10 |
| | | | | 705/319 |

(Continued)

FOREIGN PATENT DOCUMENTS

WO WO 2009090804 A1 * 7/2009 ....... G06F 17/30247

OTHER PUBLICATIONS

Hua, M., et al., "Updating Features Based on User Actions in Online Systems," U.S. Appl. No. 13/690,254, filed Nov. 30, 2012.

(Continued)

*Primary Examiner* — Polina Peach
*Assistant Examiner* — Ahmed Abraham
(74) *Attorney, Agent, or Firm* — Fenwick & West LLP (57) ABSTRACT

A composer interface allows a user to provide input, such as text data, to the social networking system. One or more images may be presented to the user via the composer interface, allowing the user to select one or more images to associate with the input. The images presented to the user may be selected based on associations of images with similar input by social networking system users. For example, images that a threshold number of users have associated with similar input are presented via the composer interface. If the user selects an image to associate with the input, the social networking system presents the selected image along with the received input in a content item presented to other social networking system users.

12 Claims, 3 Drawing Sheets

(56) References Cited

U.S. PATENT DOCUMENTS

| | | | |
|---|---|---|---|
| 2006/0047419 A1* | 3/2006 | Diendorf | G01C 21/26 701/532 |
| 2007/0011665 A1* | 1/2007 | Gandhi | H04L 67/02 717/136 |
| 2007/0060129 A1* | 3/2007 | Ramer | G06F 17/30864 455/439 |
| 2007/0136178 A1* | 6/2007 | Wiseman | G06Q 30/02 705/37 |
| 2008/0222060 A1* | 9/2008 | Perng | G06N 5/025 706/12 |
| 2010/0082431 A1* | 4/2010 | Ramer | G06Q 30/02 705/14.52 |
| 2011/0131160 A1* | 6/2011 | Canny | G06Q 30/02 706/12 |
| 2011/0179021 A1* | 7/2011 | Wen | G06F 17/30265 707/723 |
| 2012/0110064 A1* | 5/2012 | Chen | G06Q 10/10 709/203 |
| 2012/0166532 A1* | 6/2012 | Juan | G06Q 50/01 709/204 |
| 2012/0201362 A1* | 8/2012 | Crossan | G10L 15/26 379/88.01 |
| 2012/0308077 A1* | 12/2012 | Tseng | G06Q 50/01 382/103 |
| 2012/0324016 A1* | 12/2012 | Stolorz | G06Q 10/00 709/204 |
| 2014/0016872 A1* | 1/2014 | Chao | G06K 9/622 382/218 |
| 2014/0075393 A1* | 3/2014 | Mei | G06F 17/30967 715/863 |
| 2014/0187318 A1* | 7/2014 | Gallizzi | A63F 13/355 463/31 |
| 2015/0066940 A1* | 3/2015 | Fernandes | G06F 17/30867 707/740 |
| 2015/0127748 A1* | 5/2015 | Buryak | H04L 51/32 709/206 |
| 2015/0286371 A1* | 10/2015 | Degani | G06F 17/274 705/14.64 |

OTHER PUBLICATIONS

Kabiljo, I., et al., "Customized Predictors for User Actions in an Online System," U.S. Appl. No. 13/689,969, filed Nov. 30, 2012.

Shalita, A. M., et al., "Dynamic Expressions for Representing Features in an Online System," U.S. Appl. No. 13/690,088, filed Nov. 30, 2012.

Lindsay, R. T., "Ranking Data Items Based on Received Input and User Context Information," U.S. Appl. No. 13/779,481, filed Feb. 27, 2013.

Lindsay, R. T., et al., "Determining Phrase Objects Based on Received User Input Context Information," U.S. Appl. No. 13/779,485, filed Feb. 27, 2013.

* cited by examiner

SELECTING IMAGES ASSOCIATED WITH CONTENT RECEIVED FROM A SOCIAL NETWORKING SYSTEM USER

BACKGROUND

This invention relates generally to social networking systems and in particular to presenting images associated with actions or objects to a user providing content to a social networking system.

Social networking systems allow their users to efficiently communicate information with each other to encourage interactions between users. Social networking systems allow users to share content with each other, to create and maintain events for users to meet in person, to establish connections with other users, or to perform other interactions with each other. To encourage user interactions, social networking systems strive to streamline interactions between the user and the social networking system. For example, a social networking system provides its users with interfaces that seek to reduce the number of clicks to reach a page, to reduce the number of characters a user inputs to provide content to the social networking system, and to reduce clutter when presenting content to users. Simplifying user interactions with the social networking system increases the likelihood that users continue using a social networking system.

While social networking systems capture and store information describing actions taken by their users, different users may often describe similar actions differently. This may make it difficult for users to quickly ascertain the subject matter of information about another user provided by the social networking system. For example, users may provide information describing these real-world interactions as unstructured data, which may be provided in different formats by different users. This variation in formats makes it difficult for other users to efficiently discern the content of the unstructured data. For example, different users may use different words to describe an interaction, making it difficult to determine if different users are referring to the same action. Hence, presenting unstructured data to social networking systems may make it difficult for other social networking system users to identify information from the unstructured data.

SUMMARY

A social networking system provides a user with a composer interface for receiving content from the user, such as posts of content to be presented to other social networking system users. To simplify subsequent presentation of the content to other social networking system users, the user may associate an image, or other identifying information, with the content. For example, the user specifies an image associated with an action included in the content. This image is subsequently presented along with the content to other social networking system users, allowing the other users to more easily identify an action associated with the content.

The social networking system receives input from a user through a composer interface and presents the user with candidate images or candidate classifications to the user based on the received input. For example, the social networking system identifies an action from input received via the composer interface and retrieves candidate images, or classifications (e.g., types), associated with the action based on associations between images or classifications and the identified actions by other social networking system users. The candidate images or other classifications may be ranked based on prior associations between the candidate images or other classifications. For example, the social networking system maintains information associated with various images or classifications and selects candidate images or classifications associated with an action based on the maintained information. Examples of information used to select candidate images or classifications include a number of selections of an image by other users of the social networking system connected to the user, a number of selections of an image by social networking system users, a percentage of selections of the image by social networking system users, a percentage of selections of the image by other users of the social networking system connected to the user, and any combination thereof. Hence, as a user provides input via the composer interface, the social networking system displays images or classifications likely to correspond to what the user is inputting.

If the user selects a candidate image or classification, the social networking system associates the selected candidate image or candidate classification with the received input. When the received input is presented to additional users of the social networking system, the selected candidate image or classification is presented along with the input. Additionally, information associated with the selected candidate image or selected candidate classification is updated to reflect its selection. This allows the social networking system to select candidate images or classifications based on selections of images or classifications by social networking system users.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
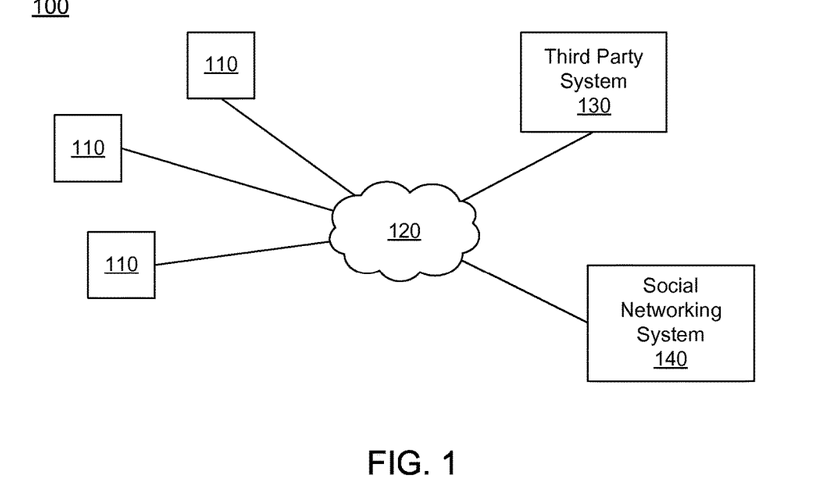
FIG. 1 is a block diagram illustrating a system environment including a social networking system, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

The social networking system 140 allows its users to post and share content, such as stories, describing themselves or their activities. For example, a story is presented to other users connected to a user posting or sharing the story, which enhances user interactions with the social networking system 140. Stories may include any data a user may add, upload, send, transmit, or "post," to the social networking system 140. For example, a user uploads a post to social networking system 140 from a client device 110. The post may include textual data (e.g., comments, status updates, notes, or links), geographic location information, photos, videos, links, music, or other data. To compose a post on the social networking system 140, users select characters by selecting or inputting characters through an input device of a client device 110. Examples of methods for providing input via a client device 110 include selecting characters from a displayed character array, typing on an external keyboard, drawing characters on a touchscreen display, selecting from a list of suggestions, or any other suitable technique. Input provided to a client device 110 is communicated to the social networking system 130 via the network 120. The social networking system 140 analyzes the received input to identify one or more images or classifications (e.g., a type) associated with the received input as further described in conjunction with FIGS. 3 and 4.

Figure 2:
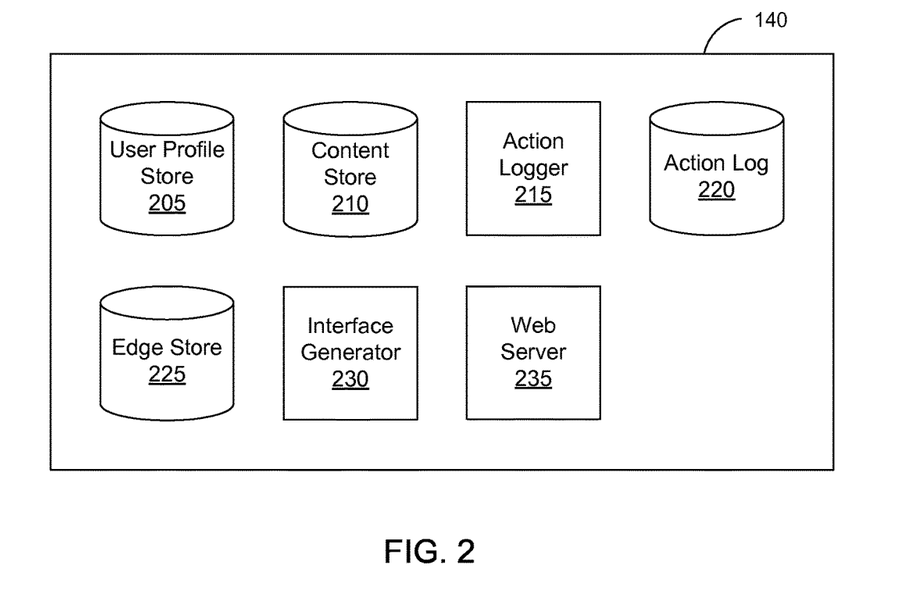
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, an interface generator 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

Additionally, the content store 210 includes one or more images or classifications and associations between the images or classifications and actions or objects by social networking system users. For example, the content store 210 includes a table identifying an image, an action from the action log 220 or an object from the content store 210, and a number of associations between the image and the action by social networking system users. As users associate an image with an action or an object, the information in the content store 210 is updated to reflect a current number or percentage of associations between an image and an action or an object. The images may be selected from a store of generic images or may be selected from images having a connection to a particular user, such as a user providing input to the social networking system. In addition to images, the content store 210 may include classifications, such as categories or types, associated with various actions or objects and information describing a number or percentage of users associating a classification with an action or an object.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The interface generator 230 processes data from other components of social networking system 140 and generates an interface communicated to client devices 110. Social networking system users view information from the social networking system 140 and provide information to the social networking system 140 via the interface. For example, information describing content presented by the interface and accessed by a user is communicated to the social networking system 140, allowing the social networking system 140 to maintain a record of content with which the user interacted. In one embodiment, the interface generator 230 determines the interactions between the client device 110 and users via the interface and processes the interactions into formats used by other components of the social networking system 140.

In one embodiment, the interface generator 230 generates a composer interface for receiving data describing content from a user for distribution to social networking system users. When a user provides text content for communicating to the social networking system 140, such as content for writing posts, making comments, entering search parameters, completing data forms and the like, the interface generator 230 presents the user with a composer interface for entering text. For example, a user may access the composer interface by interacting with another interface presented by the social networking system 140, causing the interface generator 230 to present the composer interface. In one embodiment, the composer interface is a text entry region, such as a text box, and other composition-related icons and functions. Input received via the composer interface is communicated to the social networking system 140, which stores the received input.

The interface generator 230 may also retrieve context information associated with the user providing the input from the user profile store 205, the content store 210, or the edge store 225, and identify one or more suggested data items for presentation to the user through the composer interface. In one embodiment, the context data allows the social networking system 140 to identify patterns from content previously received from the user as the user provides input via the composer interface. For example, the user may begin typing "st" into a textbox and interface generator 230 may identify data items "studying for a test" along with other similar suggestions from the user's context information if users connected to the user have a similar post or if the user has previously provided a similar post. Suggestion of data items based on input received from a user is further described in U.S. patent application Ser. Nos. 13/779,481 and 13/779,485, filed on Feb. 27, 2013, each of which is hereby incorporated by reference in its entirety.

Additionally, the interface generator 230 retrieves images associated with content received from a user and presents one or more of the retrieved images to the user. For example, the interface generator 230 retrieves images from the content store 210 associated with an action or an object associated with an action included in content received from the user. One or more of the retrieved images are presented to the user providing the content. The user may select one or more of the presented images to be associated with the content the social networking system 140 receives from the user. For example, the user selects an icon or image associated with an action included in content provided to the social networking system 140 via the composer interface. When the social networking system 140 presents the received content to additional social networking system users, the selected icon or image is also presented. This allows the additional social networking system users to more easily identify attributes of the content, such as actions or objects associated with the content. In some embodiments, the interface generator 230 presents classifiers, such as types, associated with actions or objects in the received content. Association of an image or a classifier with content provided by a user is further described below in conjunction with FIG. 4.

The web server 235 links the social networking system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or RIM®.

Example Composer Interface

Figure 3:
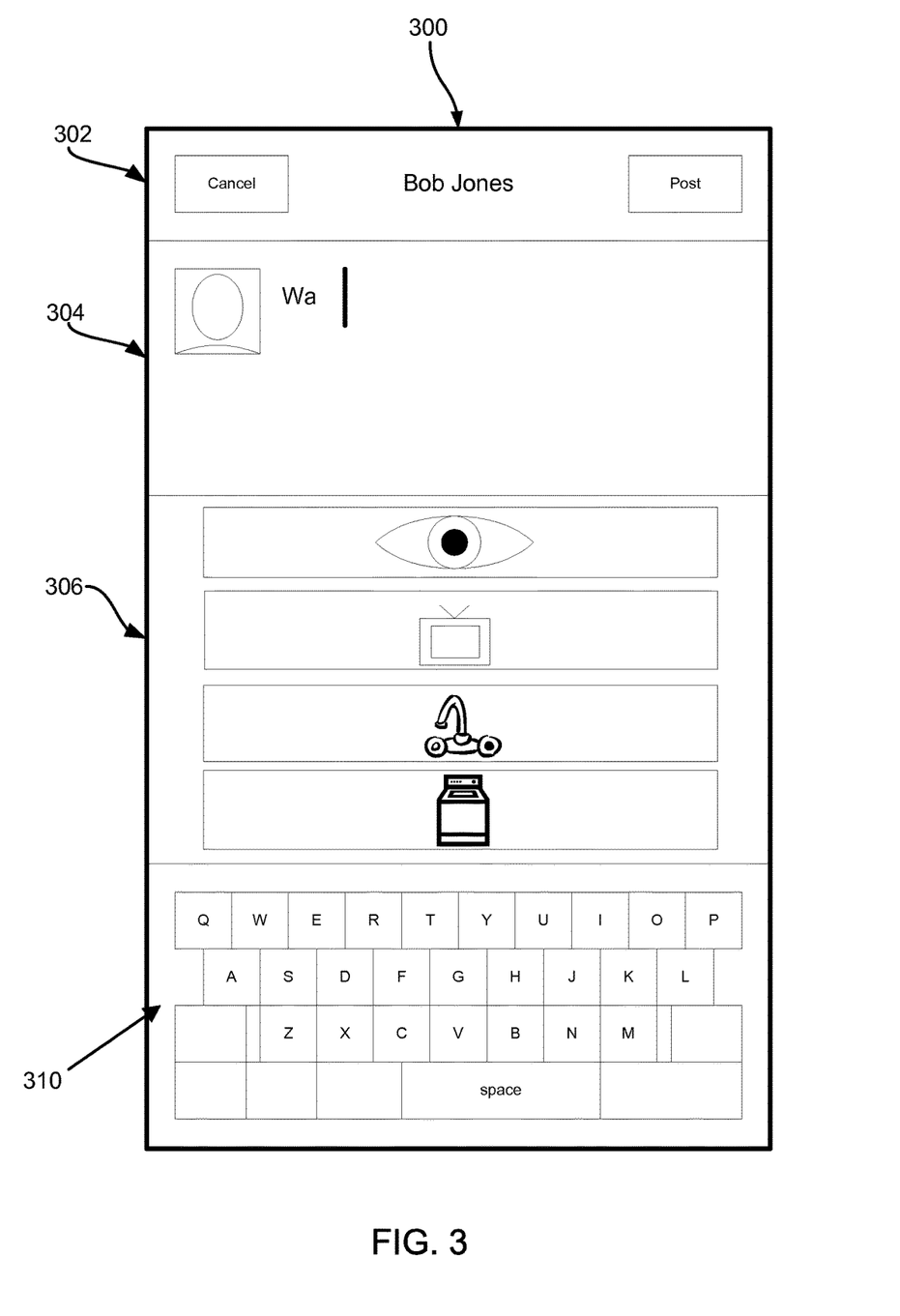
FIG. 3 is an example user interface displaying images for associating with input, in accordance with an embodiment.

When a user provides content, such as a word or a command, to the social networking system 140, the interface generator 230 presents a composer interface 300 to the user. Embodiments of a composer interface 300 are illustrated in FIG. 3. In the embodiment illustrated by FIG. 3, the composer interface 300 is optimized for a mobile device (e.g., a smartphone or tablet). Different embodiments of the composer interface 300 may be optimized for other types of computing devices, such as desktop computers or laptops.

The composer interface 300 may be dynamically modified. In FIG. 3, interface generator 230 determines images for suggestion to the user based on prior association of images with actions or objects by social networking system users. For example, the interface generator 230 presents images to a user previously associated with an action or object associated with content received from a user by a threshold number or threshold percentage of social networking system users. User-specific information may be used when selecting images for suggestion to a user, such as the number or percentage of social networking system users connected to the user associating an image with an object or action identified from content received from the user. In one embodiment, as a user inputs characters into an input field of composer interface 220, interface generator 230 identifies actions or objects from the input and retrieves candidate images associated with the identified actions or objects. Information associated with the candidate images may be used to select candidate images for presentation via the composer interface 220. Examples of information for selecting candidate images include: a number of social networking system users associating a candidate image with an identified action or object, a percentage of social networking system users associating a candidate image with an identified action or object, a number of social networking system users connected to the user associating a candidate image with an identified action or object, and a percentage of social networking system users connected to the user associating a candidate image with an identified action or object.

The composer interface 300 includes a title bar 302, a composition input box 304 (e.g., a text field), and a suggestions box 306. In some embodiments, the composer interface 200 includes a virtual keyboard 210 or may include an interface element for accessing the virtual keyboard 210. Other embodiments of the composer interface 300 may have different elements than illustrated in FIG. 3. Elements of the composer interface 300 may be dynamically modified and be configured to receive user input. For example, accessing an icon or entering a gesture may cause presentation of various options within composer interface 300, such as options to attach videos or pictures to the post, perform a friends search, retrieve a GPS location, display an extended set of candidate data items, display various other types or language keyboards, or perform other suitable actions.

The title bar 302 provides basic information and options for composer interface 300. For example, the title bar 302 identifies the name of the user providing input and options for submitting input to the social networking system 140 or for cancelling submission of the input. Other embodiments may include different information, such as the name of the social networking system 140, the name of a recipient (if the post is on another user's page), the time, the location, the type of post and so forth. In various embodiments, the title bar 302 may also include different options for manipulating the composer interface 300, such as text field options, font and size changes, attachment options, program manipulation options, or other suitable options. The title bar 302 may also be displayed in different locations relative to other elements than shown in FIG. 3 in other embodiments.

The composition input box 304 displays input, such as characters, provided to the composer interface 300 by the user. Before a user provides input, the composition input box 304 may be blank, may include a cursor indicating a text entry location, or a prompt (e.g., "What's on your mind?" or "Enter text here"), or have any other suitable format. As input is received from the user, the composition input box 304 is updated to display characters corresponding to the received inputs. Additional modifications to the composition input box 304 may be performed as input is received, such as repositioning the cursor or removing the prompt. The composition input box 304 may also include objects in addition to text input received from a user. For example, the composition input box 304 in the composer interfaces 300 includes an image of the user providing the input. Other embodiments may include a brief summary of information about the user (e.g., name and age), reminders (e.g., current time or location), option buttons (e.g., icons for adding attachments to the post, icons for attaching metadata to the post, editing options and the like), or any other suitable information.

The size of the composition input box 304 may be modified based on the amount of input received as well as the size of other components displayed by the composer interface 300. For example, the composition input box 304 may increase in size, encroaching into space expand into space used for the suggestions box 306, if the amount of input received from the user reaches a threshold amount. In another embodiment, the composition input box 304 may present a scroll bar allowing a user to scroll through the received input in the composition input box 304. For example, the composition input box 304 is reduced in size if less than a specified amount of input is received and if the interface generator 230 determines that presenting an increased number of candidate data items would improve user interaction.

The suggestions box 306 displays one or more images selected based on the received input and data stored by the social networking system 140. While FIG. 3 shows the suggestions box 306 as presenting images, classifications associated with the received input may also be displayed. For example, the suggestions box 306 displays one or more types associated with an action or an object determined from the received input. The images or classifications displayed by the suggestions box 306 is modified as additional input is received from the user, allowing the suggestions box 306 to dynamically present different images or classifications based on user input.

In embodiments of composer interface 300 designed for touch screen computing devices, such as the example shown in FIG. 3, a virtual keyboard 310 may be displayed for on-screen data entry. Users may select characters displayed for text entry and may also change between different keyboard displays (e.g., different sizes of keyboards, different keyboard layouts, different language keyboards). A keyboard button may be presented in some embodiments to increase the display area available for displaying information to the user; when the user accesses the keyboard button, the virtual keyboard 310 is presented to the user. Other embodiments of the composer interface 300 that do not use on-screen data entry may not display the virtual keyboard 310 and receive input via s a physical keyboard or other suitable input device.

Ranking Data Items for Suggestion

Figure 4:
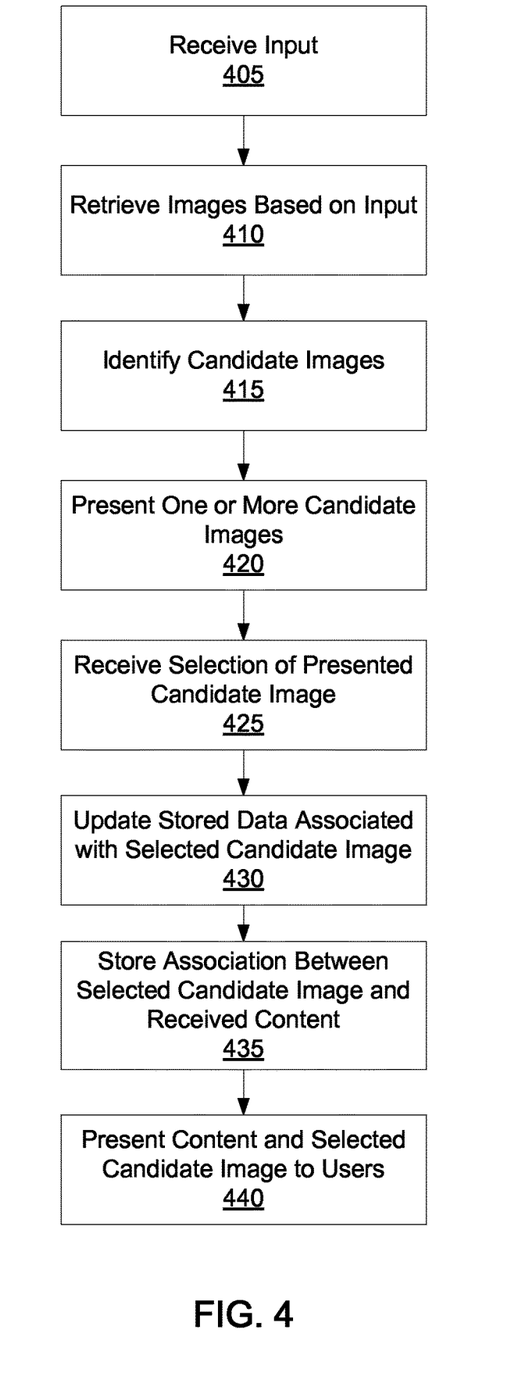
FIG. 4 is a flow chart of a method for presenting candidate images to a social networking system user based on received input, in accordance with an embodiment.

FIG. 4 is a flow chart of one embodiment of a method for identifying and displaying candidate images based on received input describing a content object to be posted to the social networking system 140. Examples of a content object described by the received input include: a message, a status update, a caption, or any other information capable of being represented as an object by social networking system 140. As the social networking system 140 receives 405 input from a user via a composer interface 300 (or other suitable channel), the interface generator 230 retrieves 410 one or more images based on the received input. For example, the interface generator 230 identifies an action or an object matching at least a portion of the received input retrieves 410 images associated with the identified action or object. Determining actions or objects matching at least a portion of the received input is further described in U.S. patent application Ser. Nos. 13/779,481 and 13/779,485, filed on Feb. 27, 2013, each of which is hereby incorporated by reference in its entirety. In one embodiment, the interface generator 230 identifies an action or an object matching at least a portion of the received input and retrieves 410 images from the content store 205 associated with the identified action or object.

From the retrieved images, one or more candidate images are identified 415 based on data in the content store 210 associated with images in the retrieved images. For example, data associated with the retrieved images describes prior selection of an image by social networking system users for association with an action identified based on the received input. Examples of stored data associated with images for identifying 415 candidate images include a number of social networking system users associating an image with an action or an object, a number of social networking system users connected to the user associating an image with an action or an object, a percentage of social networking system users associating an image with an action, and a percentage of social networking system users connected to the user associating an image with an action or an object.

In one embodiment, the retrieved images are ranked based on associated data describing prior association of the images with an action or an object identified from the received input by social networking system users. Candidate images are then identified 415 based on the ranking. For example, images having at least a threshold position in the ranking are identified 415 as candidate images. Alternatively, the candidate images are identified 415 as images having at least a threshold number or percentage of users associating an image with the action or object identified from the received input. Hence, the candidate images are identified 415 based on prior user association of images with an action or an object identified from the received input. Additional context information associated with the user from which the user is received may also be used when identifying 415 candidate images. Examples of context information association with the user includes a number of times the user has selected an image, a location associated with the user and images selected by the user while at the location, the time when the input is received 405 from the user, images associated with an action or an object identified from the input by other users at the same location as the user, and images associated with an action or an object identified from the input by other users with the user when the input is received 415.

One or more of the candidate images are presented 420 to the user. For example, candidate images previously associated with an action or an object by a threshold number or threshold percentage of social networking system users are presented 420. Additionally, the candidate images may be presented 420 in an order based on stored data associated with the candidate images. For example, the candidate images are presented 420 in an order based on the number or percentage of social networking system users that associated various candidate images with an action or an object identified from the received input.

The social networking system 140 receives 425 a selection of a candidate image from the presented candidate images and updates 430 stored data associated with the selected candidate image. While FIG. 3 describes receipt 425 of a selection of a candidate image, the user may select multiple candidate images in some embodiments, causing stored data associated with the selected candidate images to be updated 430. For example, the social networking system 140 updates a number or a percentage of social networking system users associating the selected candidate image with the action or object identified from the received input to reflect the user's association of the selected candidate image with the action or object. This allows the social networking system 140 to modify identification of candidate image when additional content including the action or the object is received. Hence, the social networking system 140 modifies subsequent identification 415 of candidate images associated with an action or an object as users associate images with actions or objects.

Updating 430 data associated with candidate images as the candidate images are selected allows the social networking system 140 to determine an image likely to be associated with an action or an object. Additionally, the social networking system 140 may aggregate data associated with candidate images associated with a group of actions or objects and use the aggregated data to determine an image likely to be associated with an action or an object from the group. This may allow the social networking system 140 to identify an image for association with a category of actions or objects. By updating the data associated with candidate images as different images are associated with actions or objects by users, the social networking system 140 presents candidate images to users more likely to be associated with actions or objects identified form user-provided input.

Additionally, the social networking system 140 stores 435 an association between the selected candidate image and the received content. The association may also include a user identifier of the user from which the content is received 405. When the social networking system receives the complete input from the user, a content item including the received input and the selected candidate image is generated and presented 440 to social networking system users, such as users connected to the user from which the input was received. An input may be determined to be completed based on various criteria. For example, an input is determined to be completed if the user submits the input to the social networking system 140, cancels or deletes the input, stops providing input for at least a threshold amount of time, or any other suitable criteria.

Presenting 440 the selected candidate image to social networking system users along with the received content allows the users to more easily identify content in the received content. While FIG. 3 describes presentation and selection of candidate images, in other embodiments, classifications may be presented to and selected by the user. For example, categories or types associated with an action or an object from the received input are identified 415 and presented 420 to the user, as described above. When the user selects a classification, data associated with the classification is updated 430 and the selected classification is presented 440 to users along with the received content. This allows a user to more easily identify categories, types, or other classifying information with content.

As input is received 405 from the user, the action or objects identified from the received input may be modified, which may modify the retrieved 410 images and cause the above-described steps to be repeated using an actions or an objects determined as additional input is received. Hence, the presented candidate images may be modified as the user provides additional input.

While described above in conjunction with the social networking system 140, the method described in conjunction with FIG. 3 may run on other types of system, such as a program executing on a computing device or on an online system. Programs receiving input, such as text input, entry may retrieve information associated with a user providing the input and suggest images or classifications, based on prior associations of images or classifications with similar input by other users. Online systems, such as online gaming sites or message boards, may similarly select and present images or classifications to users based on a received portion of a received input and associations between similar input and images or classifications by other users. An image or a classification selected by the user may be presented along with the user's content to allow other users to more easily identify the subject matter of the user's content.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   maintaining images at a-social network networking system and data associated with each image, data associated with an image describing prior selections of the image for association with one or more actions;
   receiving an input describing content to be posted to the social networking system, the input including an action of the one or more actions associated with a user;
   identifying one or more candidate images associated with the action associated with the user from the maintained images based at least in part on data associated with the one or more candidate images, the data selected from a group consisting of: a number of selections associating a candidate image with the identified object by other users of the social networking system connected to the user in an edge store maintained by the social networking system including connections between users of the social networking system, a number of selections associating the candidate image with the identified object by social networking system users, a percentage of selections associating the candidate image with the identified object by other users of the social networking system connected to the user in the edge store maintained by the social networking system including connections between users of the social networking system, a percentage of selections associating the candidate image with the identified object by users of the social networking system, and any combination thereof by:
      determining a plurality of images associated with the action associated with the user by at least a threshold number of users from information identifying actions performed by users of the social networking system in an action log maintained by the social networking system,
      ranking the plurality of images based on data associated with each of the plurality of images by the online system,
      selecting the one or more candidate images based at least in part on the ranking,
      identifying an object associated with the action associated with the user from the received input from information in the action log maintained by the social networking system associating actions with objects maintained by the social networking system,
      identifying one or more images associated with the identified object, and
      identifying one or more candidate images associated with the identified object based at least in part on data associated with the candidate images associated with the identified object by the social networking system;
   presenting the one or more identified candidate images to the user in a dynamically modifiable composer interface optimized for presentation by a client device presenting the composer interface and including a virtual keyboard having options for changing how the virtual keyboard is displayed within the dynamically modifiable composer interface;
   receiving a selection of an image from the presented one or more identified candidate images;
   updating data stored by the social networking system describing selection of the selected image in the action log describing actions performed by users of the social networking system based on the selection of the selected candidate image by modifying a number of users of the social networking system selecting the selected identified candidate image; and
   storing, in the action log maintained by the social networking system identifying actions performed by users of the social networking system, an association between the content to be posted to the social networking system, a user identifier associated with the user, the selected image, and the action associated with the user.

2. The method of claim 1, wherein the data associated with the candidate images associated with the identified object by the social networking system is selected from a group consisting of: a number of selections associating a candidate image with the identified object by other users of the social networking system connected to the user connected to the user in the edge store maintained by the social networking system including connections between users of the social networking system, a number of selections associating the candidate image with the identified object by social networking system users, a percentage of selections associating the candidate image with the identified object by other users of the social networking system connected to the user connected to the user in the edge store maintained by the social networking system including connections between users of the social networking system, a percentage of selections associating the candidate image with the identified object by users of the social networking system, and any combination thereof.

3. The method of claim 1, wherein updating data stored by the social networking system describing selection of the selected image based on the selection of the selected candidate image comprises:
modifying a percentage of users of the social networking system selecting the selected candidate image.

4. The method of claim 1, wherein presenting the one or more candidate images to the user comprises:
presenting the one or more candidate images to the user in an order based at least in part on selections of the candidate images by users of the social networking system.

5. A computer-implemented method comprising:
maintaining images at a social network networking system and data associated with each image, data associated with an image describing prior selections of the image for association with one or more actions;
receiving an input describing content to be posted to the social networking system from a user;
retrieving one or more images associated with data matching at least a portion of the received input from the maintained images;
identifying one or more candidate images from the retrieved one or more images from the maintained images based at least in part on data describing prior associations of the retrieved one or more images with data matching at least the portion of the received input by users of the social networking system connected to the user through the social networking system, the data selected from a group consisting of: a number of selections of an image by other users of the social networking system connected to the user in an edge store maintained by the social networking system including connections between users of the social networking system, a number of selections of an image by social networking system users, a percentage of selections of the image by social networking system users, a percentage of selections of the image by other users of the social networking system connected to the user in the edge store maintained by the social networking system including connections between users of the social networking system, and any combination thereof, by:
ranking the retrieved one or more images based at least in part on the data describing association of images with data matching at least the portion of the received input by users of the online system from information identifying actions performed by users of the social networking system in an action log maintained by the social networking system, and
selecting the one or more candidate images based at least in part on the ranking;
presenting the one or more candidate images to the user in a dynamically modifiable composer interface optimized for presentation by a client device presenting the composer interface and including a virtual keyboard having options for changing how the virtual keyboard is displayed within the dynamically modifiable composer interface;
receiving a selection of an image from the presented one or more candidate images;
updating data stored in the action log maintained by the social networking system identifying actions performed by users of the social networking system to describe selection of the selected image based on the selection of the selected candidate image by modifying a number of users of the online system selecting the selected candidate image; and
storing, in the action log maintained by social networking system identifying actions performed by users of the social networking system, an association between the content to be posted to the social networking system and the selected image.

6. The method of claim 5, further comprising:
presenting a content item including the received content and the selected image to one or more additional users of the social networking system.

7. The method of claim 5, wherein selecting the one or more candidate images based at least in part on the ranking comprises:
selecting one or more images having at least a threshold position in the ranking.

8. The method of claim 5, wherein updating data stored by the social networking system describing selection of the selected image based on the selection of the selected candidate image comprises:
modifying a percentage of users of the social networking system selecting the selected candidate image.

9. The method of claim 5, wherein presenting the one or more candidate images to the user comprises:
presenting the one or more candidate images to the user in an order based at least in part on selections of the candidate images by users of the social networking system.

10. A computer-implemented method comprising:
maintaining classifications at a social network networking system and data associated with each classification, data associated with a classification describing prior associations of the classification with data received by the social networking system;
receiving an input describing content to be posted to the social networking system from a user;
retrieving one or more classifications associated with data matching at least a portion of the received input from the maintained classifications;
identifying one or more candidate classifications from the maintained classifications based at least in part on data describing prior associations of the one or more classifications with data matching at least the portion of the received input by users of the social networking system connected to the user through the social networking system, the data describing prior association of the classifications with data matching at least the portion of the received input by users of the social networking system connected to the user is selected from a group consisting of: a number of selections of a classification by other users of the social networking system connected to the user in an edge store maintained by the social networking system including connections between users of the social networking system, a number of selections of a classification by social networking system users, a percentage of selections of the classification by social networking system users, a percentage of selections of the classification by other users of the social networking system connected to the user in an edge store maintained by the social networking system including connections between users of the social networking system, and any combination thereof, by:
  ranking the retrieved one or more classifications based at least in part on the data describing association of classifications with data matching at least the portion of the received input by users of the online system from information identifying actions performed by users of the social networking system in an action log maintained by the social networking system, and selecting the one or more candidate classifications based at least in part on the ranking;
presenting the one or more candidate classifications to the user in a dynamically modifiable composer interface optimized for presentation by a client device presenting the composer interface and including a virtual keyboard having options for changing how the virtual keyboard is displayed within the dynamically modifiable composer interface;
receiving a selection of a classification from the presented one or more candidate classifications;
updating data stored by the action log maintained by the social networking system to describe selection of the selected classification based on the selection of the selected candidate classification by modifying a number of users of the online system selecting the selected classification; and
storing, in the action log maintained by social networking system identifying actions performed by users of the social networking system, an association between the content to be posted to the social networking system and the selected classification.

11. The method of claim 10, further comprising:
presenting a content item including the received content and the selected classification to one or more additional users of the social networking system.

12. The method of claim 10, wherein a classification is selected from a group consisting of: a type, a category, an image, and any combination thereof.

* * * * *

UNITED STATES PATENT AND TRADEMARK OFFICE
CERTIFICATE OF CORRECTION

PATENT NO. : 9,916,329 B2
APPLICATION NO. : 13/933571
DATED : March 13, 2018
INVENTOR(S) : Robert Taaffe Lindsay Page 1 of 1

It is certified that error appears in the above-identified patent and that said Letters Patent is hereby corrected as shown below:

In the Claims

Column 13, Line 50, after "images at" delete "a-social" and insert -- a social --.
Column 14, Line 62, after "networking system" delete "connected to the user".
Column 15, Line 2, after "networking system" delete "connected to the user".
Column 15, Line 22, after "a social" delete "network".
Column 16, Line 37, after "a social" delete "network".

Signed and Sealed this
Twenty-eighth Day of August, 2018

Andrei Iancu
*Director of the United States Patent and Trademark Office*